United States Patent
Haislip et al.

(10) Patent No.: US 11,451,460 B1
(45) Date of Patent: Sep. 20, 2022

(54) CONDITION-BASED MANAGEMENT OF SHARED MOBILE EDGE COMPUTING FOR 5G OR OTHER NEXT GENERATION NETWORK

(71) Applicant: AT&T Intellectual Property I, L.P., Atlanta, GA (US)

(72) Inventors: Kim Haislip, Stone Mountain, GA (US); Mrinalini Natarajan, Morganville, NJ (US); Kristopher Haislip, Stone Mountain, GA (US); Shiv Kumar, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/207,297

(22) Filed: Mar. 19, 2021

(51) Int. Cl.
| | |
|---|---|
| *G06F 15/173* | (2006.01) |
| *H04L 43/0882* | (2022.01) |
| *H04L 43/028* | (2022.01) |
| *H04L 9/40* | (2022.01) |
| *H04L 43/16* | (2022.01) |
| *H04L 12/14* | (2006.01) |
| *H04L 67/52* | (2022.01) |

(52) U.S. Cl.
CPC .......... *H04L 43/0882* (2013.01); *H04L 12/14* (2013.01); *H04L 43/028* (2013.01); *H04L 43/16* (2013.01); *H04L 63/0236* (2013.01); *H04L 67/52* (2022.05)

(58) Field of Classification Search
CPC ..... H04L 43/0882; H04L 12/14; H04L 43/16; H04L 67/18; H04L 43/028; H04L 63/0236; H04L 41/0896; H04L 63/107; H04L 67/52; H04W 4/02; H04W 4/021; H04W 4/025; H04W 12/37
USPC ............ 709/223, 224, 226; 455/456.1, 456.3
See application file for complete search history.

(56) References Cited

U.S. PATENT DOCUMENTS

| | | | |
|---|---|---|---|
| 6,578,077 B1 * | 6/2003 | Rakoshitz | H04L 1/1854 709/224 |
| 2007/0286135 A1 * | 12/2007 | Kirke | H04W 4/00 370/338 |
| 2012/0088487 A1 * | 4/2012 | Khan | H04L 67/24 455/418 |
| 2013/0122857 A1 * | 5/2013 | Karaoguz | H04W 4/24 455/405 |
| 2013/0159150 A1 * | 6/2013 | Hao | G06Q 10/06 705/30 |
| 2014/0066101 A1 * | 3/2014 | Lyman | H04W 4/021 455/456.3 |
| 2014/0113613 A1 * | 4/2014 | Huang | H04W 64/00 455/418 |

(Continued)

*Primary Examiner* — Johnny B Aguiar
(74) *Attorney, Agent, or Firm* — Amin, Turocy & Watson, LLP

(57) ABSTRACT

A mobile edge computing system can utilize a server to host and partition user equipment data for a local area network. For example, a first mobile device can send partition data to the service, wherein the partition data is representative criteria associated with which data should be associated with a particular business entity. After the criteria is established, the server can enforce the criteria upon any mobile device that is within a defined geographic location subject to the criteria. When the criteria are enforced, the server device can determine how much data has been utilized against an account of the business entity.

20 Claims, 10 Drawing Sheets

(56) References Cited

U.S. PATENT DOCUMENTS

| | | | | |
|---|---|---|---|---|
| 2014/0208397 A1* | 7/2014 | Peterson | ............... | G06F 21/123 |
| | | | | 726/4 |
| 2015/0065170 A1* | 3/2015 | Brisebois | .............. | H04W 4/023 |
| | | | | 455/456.3 |
| 2016/0328225 A1* | 11/2016 | Luk | ......................... | H04L 67/20 |
| 2017/0142597 A1* | 5/2017 | MacDonald | ........ | H04L 41/0896 |
| 2017/0237862 A1* | 8/2017 | Haslestad | ............. | H04M 15/67 |
| | | | | 455/406 |
| 2019/0098446 A1* | 3/2019 | Jain | ....................... | G06F 16/903 |

\* cited by examiner

CONDITION-BASED MANAGEMENT OF SHARED MOBILE EDGE COMPUTING FOR 5G OR OTHER NEXT GENERATION NETWORK

TECHNICAL FIELD

This disclosure relates generally to facilitating mobile edge computing. For example, this disclosure relates to facilitating mobile edge computing for multiple tenants for a $5^{th}$ generation (5G), or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to mobile edge computing for multiple tenants is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
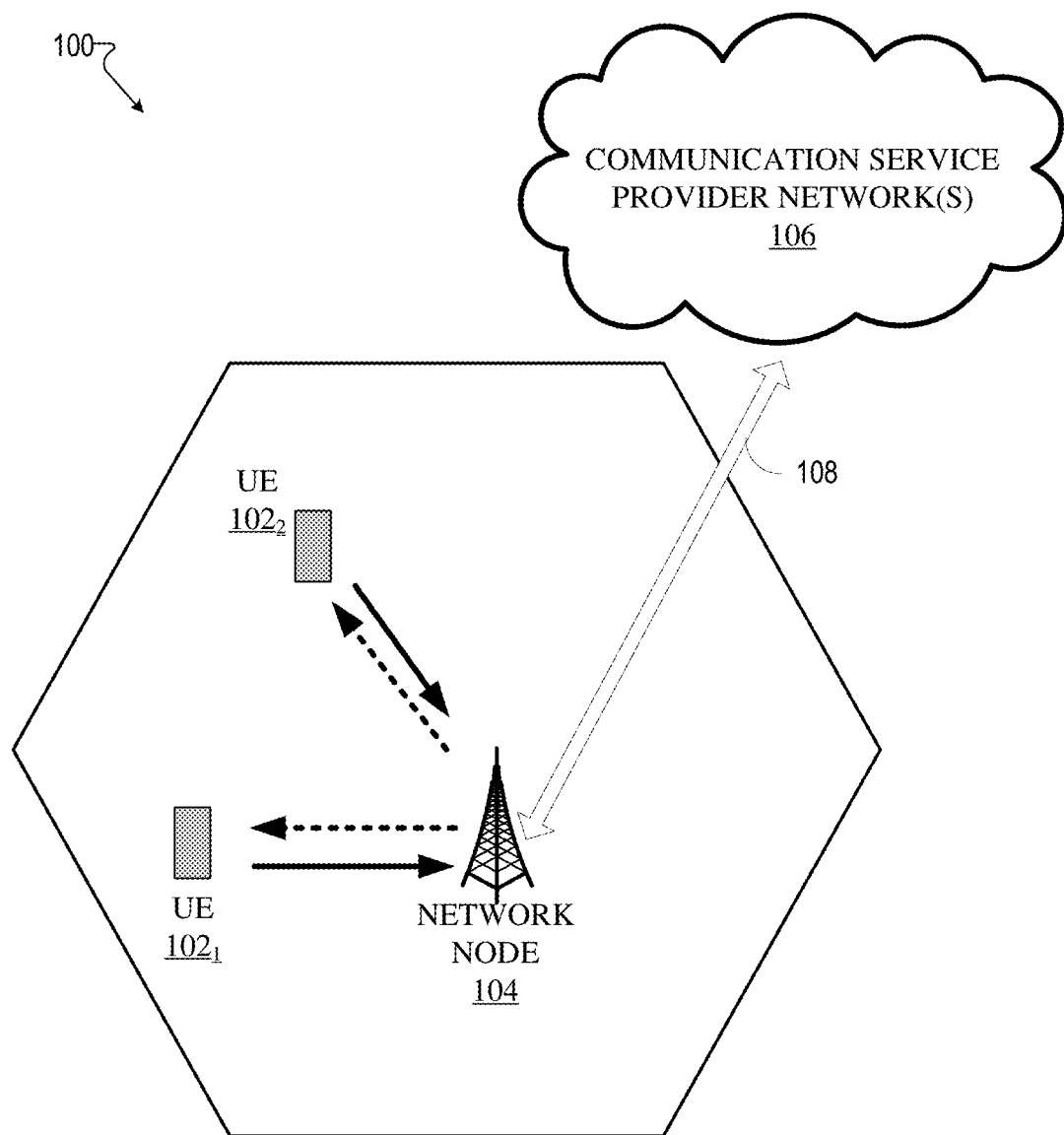
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate mobile edge computing for multiple tenants for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), wireless fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate mobile edge computing for multiple tenants for a 5G network. Facilitating mobile edge computing for multiple tenants for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, personal digital assistant (PDA), tablet, mobile terminals, smart phone, IOT device, laptop embedded equipped (LEE), laptop mounted equipment (LME), universal serial bus (USB) dongles, etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves a UE or network equipment connected to other network nodes or network elements or any radio node from where UE receives a signal. Non-exhaustive examples of radio network nodes are Node B, base station (BS), multi-standard radio (MSR) node such as MSR BS, evolved UMTS terrestrial radio access network (E-UTRAN) node B (eNode B), next generation (g) node B (gNode B), network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, remote radio unit (RRU), remote radio head (RRH), nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as orthogonal frequency division multiplexing (OFDM), each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Mobile edge computing (MEC) can be hosted at a specific site. For example, a MEC multi-tenant system can comprise a cell tower with a baseband unit (BBU) and a radio unit (RU), a smart integrated access device (SIAD) router, and a MEC server that comprises the software that connects to a core network. The SIAD router can aggregate multiple BBUs at the site and connect support equipment at the site. The SIAD router can also provide routing upstream toward the packet core and failure detection, which can result in rerouting of packet data. This system can be placed on a customer premises that would like faster or a more secure network in general. The MEC multi-tenant system can be placed at a site that comprises multiple businesses to allow multiple companies to use the equipment and partition customer data so that each customer's data is separate. For example, in a mall, each store could use a piece of the MEC multi-tenant system. Thus, as customers walk around the mall and utilize mobile applications that are associated with each of the businesses utilizing the MEC multi-tenant system, their phones could connect to the service provider network that is dedicated to that specific application. Each business could pay for a specific amount of traffic (e.g., 10 gigabytes (Gbs)/month) for their customers to utilize while connected to the MEC multi-tenant system. The MEC multi-tenant system can also comprise one or more additional servers for disaster recovery purposes such that the one or more additional servers can be utilized in the case of a failure of the primary server.

Filtering criteria can be configurable within the server. For example, each business can have its own login to create and/or modify the filtering criteria for offloading traffic (e.g., what type of traffic goes to the server, what type of traffic is dedicated to the MEC multi-tenant system, etc.). The offloading can be based on mobile applications, on phone numbers, and/or an international mobile subscriber identity (IMSI). For example, if a business wanted to ensure that all of their employees' phones used the MEC multi-tenant system, the business could access a portal webpage and create and/or modify the filtering criteria to be associated with employees' phone numbers and/or a specific application associated with that business. The filter could also be based on a device (e.g., IOT, drone, mobile device, or the like) such as a camera. For example, a serial number associated with a nearby video camera can be input into the portal to partition data associated with the nearby camera. When the filtering criteria is satisfied, the mobile device can utilize the local RAN (e.g., MEC multi-tenant system). However, if the filtering criteria is not satisfied, then the mobile device can utilize a service provider network.

Bandwidth monitoring can be performed on a per tenant basis. For example, if a business purchases a 10 Gb plan, the MEC multi-tenant system can monitor each businesses bandwidth and throttle bandwidth (e.g., fee throttling, and/or pushing the business back to the service provider network) accordingly with a business surpasses that surpasses their bandwidth allotment. This can prevent other business from being adversely affected when another business surpasses their bandwidth allotment.

The MEC multi-tenant system can also comprise the ability to perform health checks and reporting on a per tenant basis. For example, a health check can be performed by pinging the system and if the system does not respond, then the system can be deemed not healthy or the system can be deemed to be out of service. Consequently, a remedial action can be performed to place the system back in service. This increases the average availability and resiliency of the service. Additionally, the MEC multi-tenant system can differentiate key performance indicators (KPIs) for each tenant. For example, KPIs can be the central processing unit (CPU) memory statistics that can assist in the understanding of the utilization.

In one embodiment, described herein is a method comprising determining, by server equipment comprising a processor, that a first user equipment is at a location associated with a tenant identity indicative of a tenant. The method can comprise receiving, by the server equipment from router equipment, user equipment data representative of subscriber traffic from the first user equipment. The method can comprise receiving, by the server equipment from a second user equipment, condition data representative of a condition to be applied to the subscriber traffic. Additionally, in response to the condition being determined to have been satisfied, the method can comprise sending, by the server equipment, the subscriber traffic to a data store. Furthermore, in response to sending the subscriber traffic to the data store, the method can comprise sending, by the server equipment, application data to the first user equipment to utilize an application associated with the tenant identity.

According to another embodiment, a system can facilitate, determining that a first user equipment associated with a tenant identity has satisfied a location criterion associated with authorized utilization of radio access network equipment. In response to determining that the first user equipment has satisfied the location criterion, the system can comprise receiving, from router equipment, user equipment data representative of subscriber traffic from the first user equipment. The system can comprise receiving, from a second user equipment, condition data representative of a condition to be applied to the subscriber traffic. Additionally, in response to the condition being determined to have been satisfied, the system can comprise sending the user equipment data representative of the subscriber traffic to a data store. Furthermore, in response to sending the user equipment data representative of the subscriber traffic to the data store, the system can comprise sending, to the first user equipment, application data representative of an application.

According to yet another embodiment, described herein is a machine-readable medium that can perform the operations comprising determining that a first user equipment is at a location associated with a tenant identity associated with a local area network. The machine-readable medium can perform the operations comprising receiving, from router equipment, user equipment data representative of subscriber traffic from the first user equipment. The machine-readable medium can perform the operations comprising receiving, from a second user equipment, condition data representative of a condition to be applied to the subscriber traffic. Additionally, in response to the condition being determined to have been satisfied, the machine-readable medium can perform the operations comprising sending the user equipment data to a data store. Furthermore, in response to sending the user equipment data to the data store, the machine-readable medium can perform the operations comprising sending application data to the first user equipment for the first user equipment to utilize an application associated with the tenant identity.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop multiple-input multiple-output (MIMO) mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE frequency division duplex (FDD)/time division duplex (TDD), global system for mobile communications (GSM)/GSM edge radio access network (GERAN), code division multiple access (CDMA) 2000 (CDMA2000) etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 gigabytes per second (Gbps)), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network may utilize higher frequencies (e.g., >6 GHz) to aid in increasing capacity. Currently, much of the millimeter wave (mmWave) spectrum, the band of spectrum between 30 gigahertz (gigahertz (GHz)) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
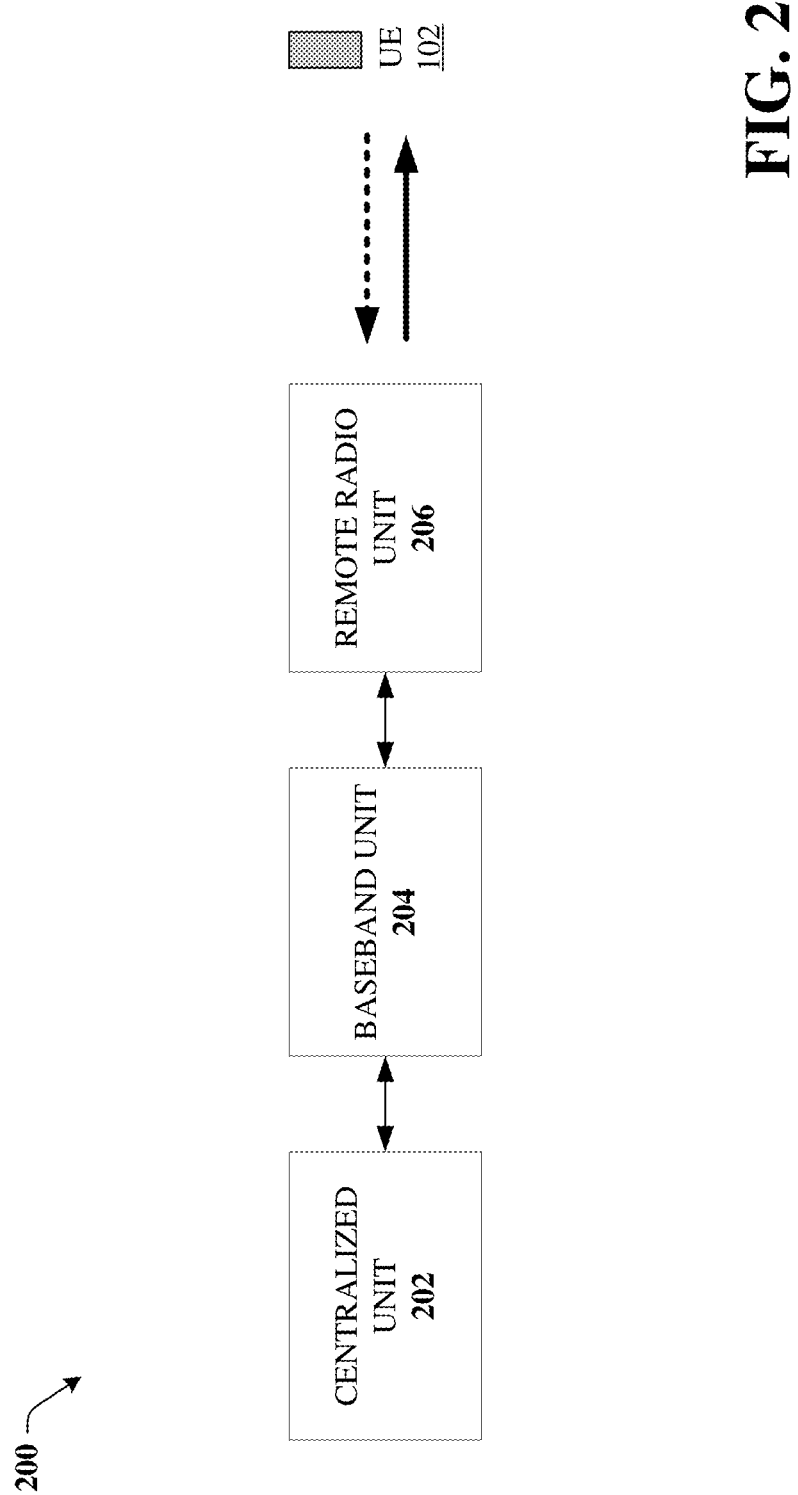
FIG. 2 illustrates an example schematic system block diagram of a cloud radio access network architecture according to one or more embodiments.

Referring now to FIG. 2, illustrated is an example schematic system block diagram of a cloud radio access network architecture 200 according to one or more embodiments. The cloud radio access networks (C-RAN) also called centralized RAN is a cellular architecture where the baseband digital units (DU) 204 can be centralized as a virtual resource pool and the remote radio units (RU) 206 can be located at places which are up to several miles away from the DU 204 and or centralized unit (CU) 202. FIG. 2 depicts the block diagram of the C-RAN. The link between DU 204 and the RU 206 is called a front haul.

In an embodiment, there can be a CU 202 that performs upper level medium access control (MAC), a DU 204 that performs lower level MAC and physical layer functionality, and an RU 206 that can transmit and receive radio frequency (RF) signals and convert analog signals to digital signals and vice versa. Each of the CU 202, DU 204, and RU 206 can be linked via a fiber optical network or other high bandwidth front haul network. To reduce complexity and bandwidth, the transmissions sent between the CU 202, DU 204, and RU 206 can be digital, so the RU 206 can receive analog signals and convert the analog RF signals to digital before transmitting to the DU 204. Similarly, the RU 206 can receive a digital transmission comprising the in phase and quadrature (IQ) data and beamforming coefficients, perform the digital beamforming, and perform a digital to analog conversion at the RU 206.

A network node of the service provider network can be part of a split architecture network or integrated access backhaul network where base stations can be split into core units comprising a baseband processing unit (DU) 204 and a remote radio unit (RU) 206. The RU 206 can transmit uplink data to the baseband unit DU 204 and the baseband unit DU 204 can transmit downlink data to the remote radio unit 206 as shown in FIG. 2. Thus, a split RAN architecture can separate the front end unit, RU 206, and the signal processing CU 202 into two physically separate entities to allow a network to deploy many small and RUs 206 at remote locations with a large and highly advanced DU 204 at a more centralized location with appropriate power and cooling requirements. However, the RU 206 and DU 204 can continuously transmit data to each other over serial links.

Figure 3:
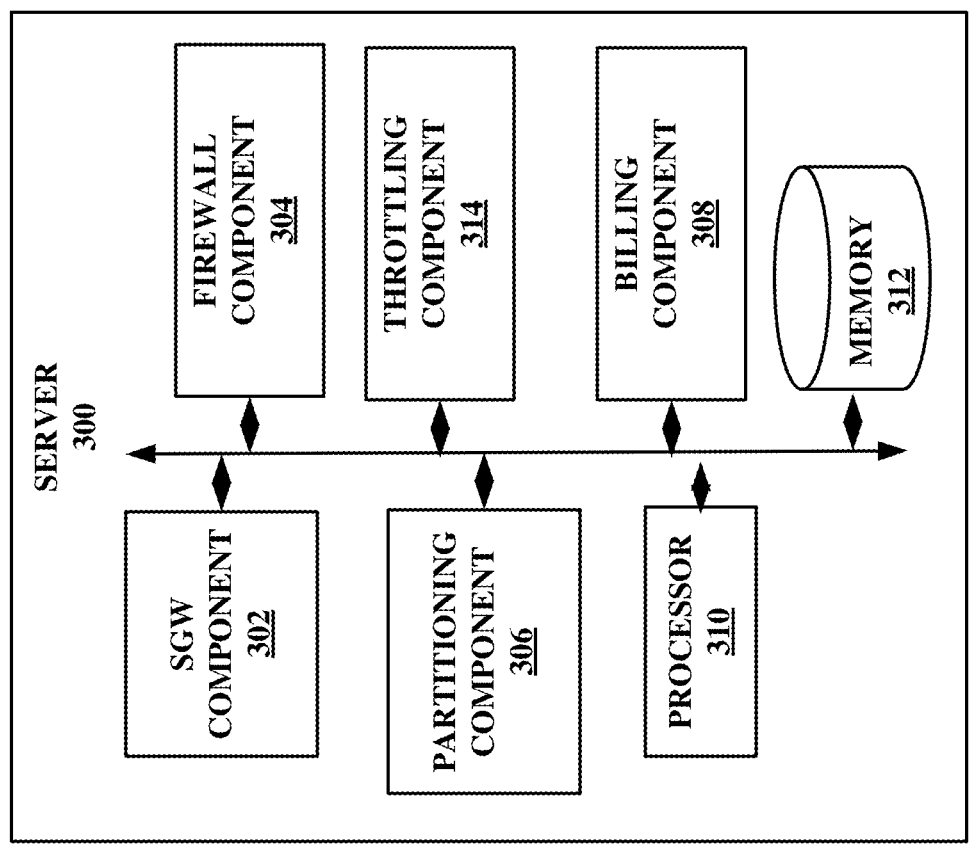
FIG. 3 illustrates an example schematic system block diagram of a server according to one or more embodiments.

Referring now to FIG. 3, illustrated is an example schematic system block diagram of a server 300.

In the embodiment shown in FIG. 3, the server 300 can comprise sub-components (e.g., serving gateway (SGW) component 302, firewall component 304, partitioning component 306, throttling component 314, and billing component 308), processor 310 and memory 312 can bi-directionally communicate with each other. It should also be noted that in alternative embodiments that other components including, but not limited to the sub-components, processor 310, and/or memory 312, can be external to the server 300. Aspects of the processor 310 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the server 300. In an aspect, the server can also include memory 312 that stores computer executable components and instructions.

After determining that packet data destined for an enterprise (e.g., tenant), the SGW component 302 can forward the packet data to the partitioning component 306. Based on a condition being determined to be satisfied, the partitioning component 306 can partition the packet data. For example, if the packet data was received from a UE 102 that has been identified by the server 300 as being associated with the enterprise, then the partition component 306 can separate this packet data from other packet data that is not associated with the enterprise and forward this packet data to the firewall component 304. The firewall component 304 can then send this packet data to a customer infrastructure (e.g., website, mobile application, or the like). The billing component 308 can assess packet data that is associated with the enterprise, based on the UE 102, and generate billing data and/or send billing information to a service provider to generate the billing data. Thus, the billing data can be specific to the enterprise. The throttling component 314 can throttle data associated with the enterprise based on various conditions being determined to have been satisfied. For example, if the enterprise has only purchased 5 Gbs of data and the UEs 102 data traffic begins to approach this threshold, the throttling (e.g., limiting data) component 314 can begin to throttle data that is received by the UE 102 whilst on the enterprise's local area network.

Figure 4:
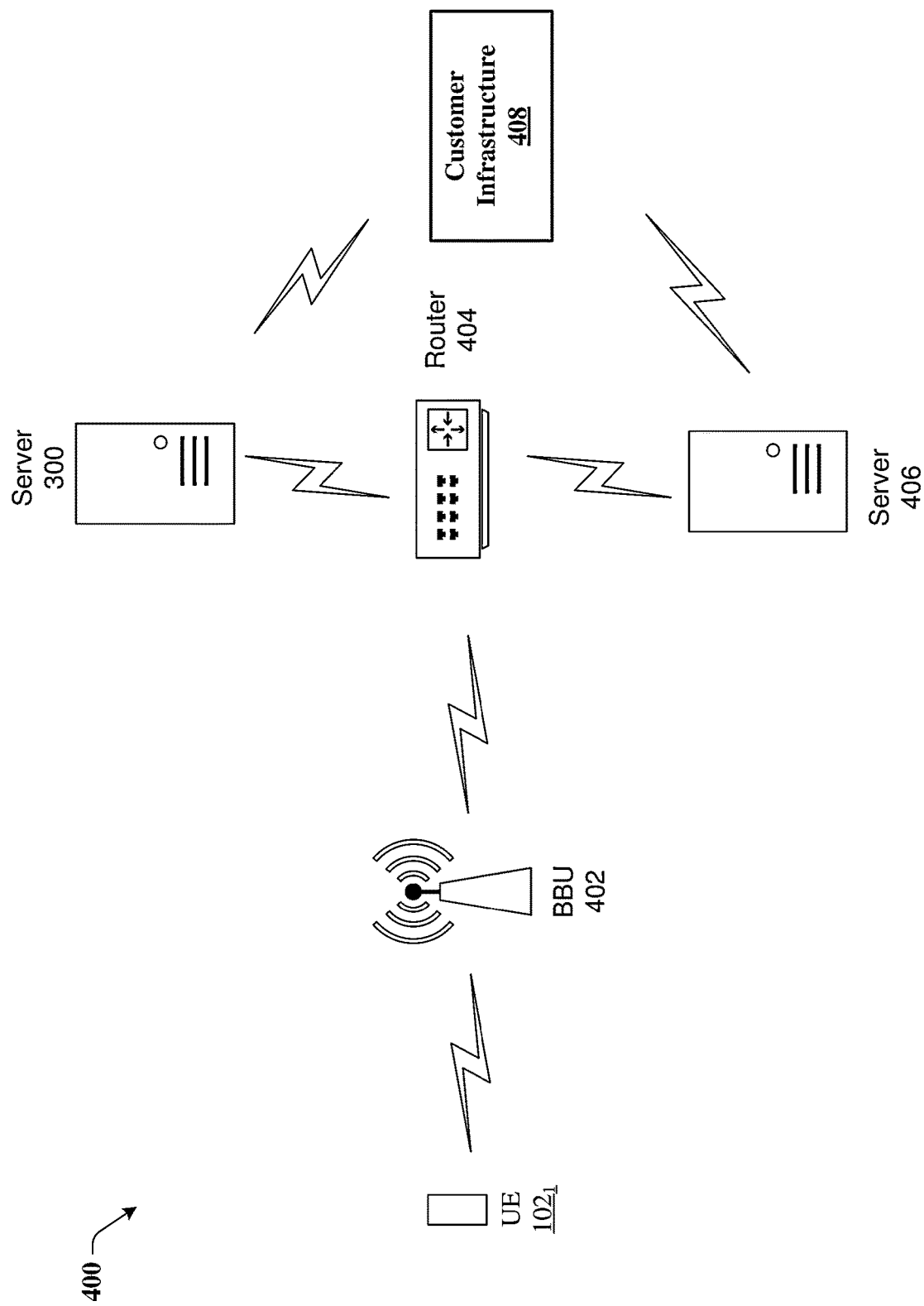
FIG. 4 illustrates an example schematic system block diagram of a mobile edge computing multi-tenant system according to one or more embodiments.

Referring now to FIG. 4 and FIG. 4, illustrated are example schematic system block diagrams of mobile edge computing multi-tenant systems 400, 500 according to one or more embodiments.

Figure 5:
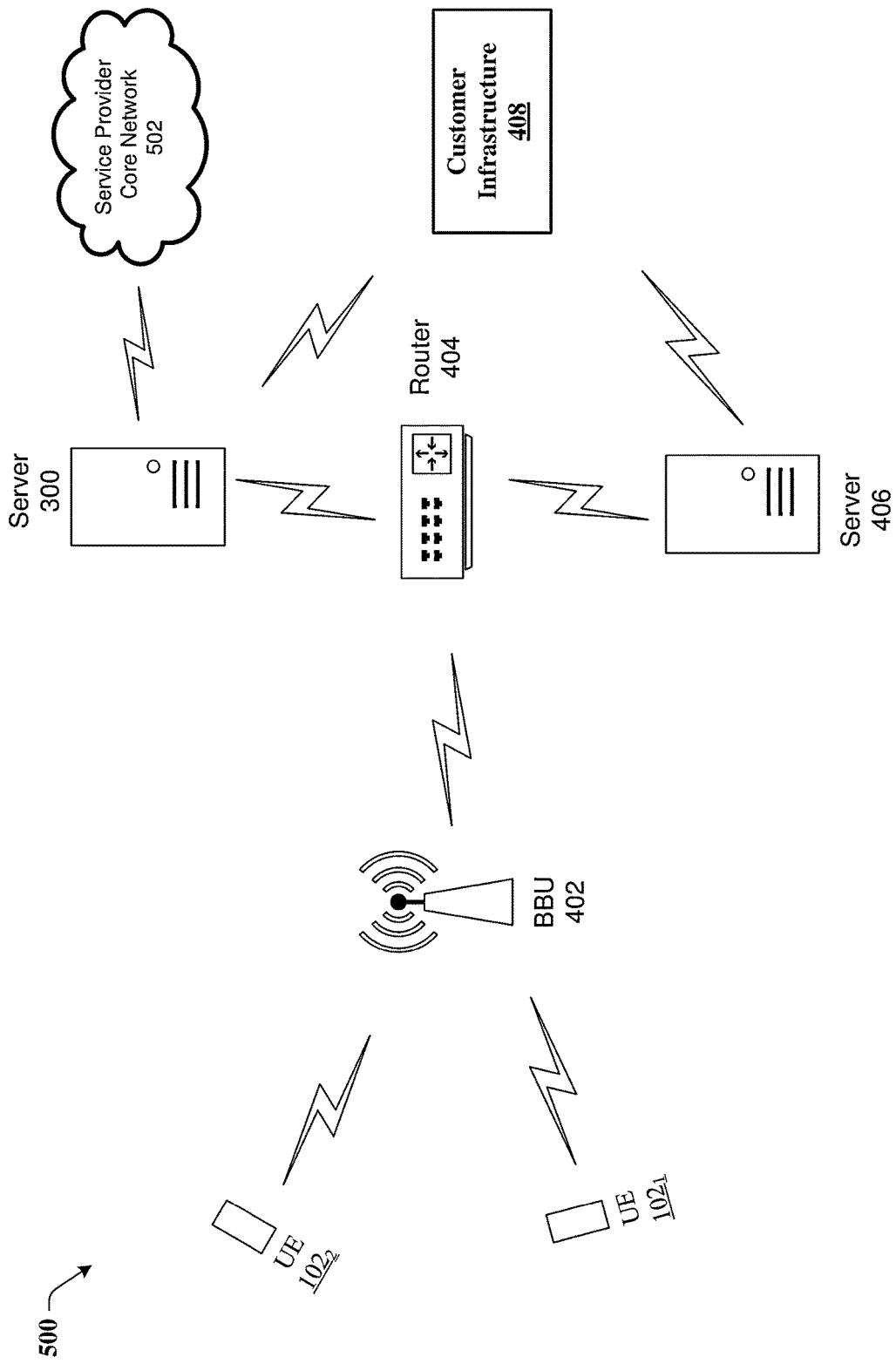
FIG. 5 illustrates an example schematic system block diagram of a mobile edge computing multi-tenant system comprising a service provider network according to one or more embodiments.

The MEC multi-tenant system 400 can receive packet data via an onsite baseband unit (BBU) 402 from the UE $102_1$ that is located within a defined geographic area relative to the BBU 402 and/or the server 300. The BBU 402 can comprise an eNB and/or a gNB. The eNB or gNB can send the packet data upstream to a router 404 so that the router 404 can send the packet data to the server 300. The SGW component 302 of the server 300 can receive the packet data. Based on one or more criteria, the partitioning component 306 can partition the packet data as being associated with a specific phone number, IMSI, tenant, and/or device type, resulting in partitioned data. After the packet data has been associated with a particular tenant, the SGW component 302 can send the partitioned data to the firewall component 304 to be sent to a customer infrastructure. Therefore, the packet data that is eligible for breakout can be sent to a customer infrastructure database 408 (e.g., website, mobile application, or the like) via the firewall component 304. Consequently, the data partitioning procedures are happening locally (e.g., utilizing the local RAN infrastructure) without sending data to a service provider network as depicted in FIG. 5. For overall billing purposes (e.g., metering and reporting purposes), the SGW component 302 of the server 300 can send data (e.g., non-userplane traffic) to the service provider core network 502. Therefore, if UE $102_1$ is within a defined area of the MEC multi-tenant system 400, 500 and the filtering criteria is based on the UE $102_1$ utilizing a business application associated with a specific business (e.g., tenant), then when the UE $102_1$ utilizes that application, the data will be charged against that businesses' account. It should be noted that in other embodiments the MEC multi-tenant system 400, 500 can comprise multiple BBUs, RUs, SIAD routers, and/or servers. For example, as depicted in FIGS. 4 and 5, a redundant server 406 (e.g., backup server) can be utilized for in case there is an outage associated with the primary server 300.

Additionally, as depicted in FIG. 5, and referenced above, the criteria for packet data partitioning can be received from another UE 1022 that has accessed MEC multi-tenant system portal to define the filtering criteria. The business (e.g., tenant) can utilize the MEC multi-tenant system portal to configure the policies associated with data users for their respective businesses, add/remove UEs $102_1$ from the MEC multi-tenant system 500, purchase additional bandwidth via the service provider core network 502, set KPIs, and/or determine at what percent use of their allocated data that data limiting should begin/end.

The filtering criteria can be configurable within the server 300. For example, each business can create and/or modify the filtering criteria for determining which types of traffic are to be associated with the businesses data account. Thus, the partitioning (via the partitioning component 306) can be based on mobile application usage, mobile application type, a phone number, an IMSI, and/or a device. For example, if a business wanted to ensure that all of their employees' phones used the MEC multi-tenant system 400, 500, the business could access a portal webpage via UE 1022 and create and/or modify the filtering criteria to be associated with employees phone numbers and/or a specific application associated with that business. The filter could also be based on a device (e.g., IOT, drone, mobile device, or the like) such as a camera. When the filtering criteria are satisfied, the UE $102_1$ can utilize the local RAN (e.g., MEC multi-tenant system) external to utilizing the service provider core network 502. However, if at any point the filtering criteria is not satisfied, then the UE 1022 can default to utilizing the service provider core network 502.

Figure 6:
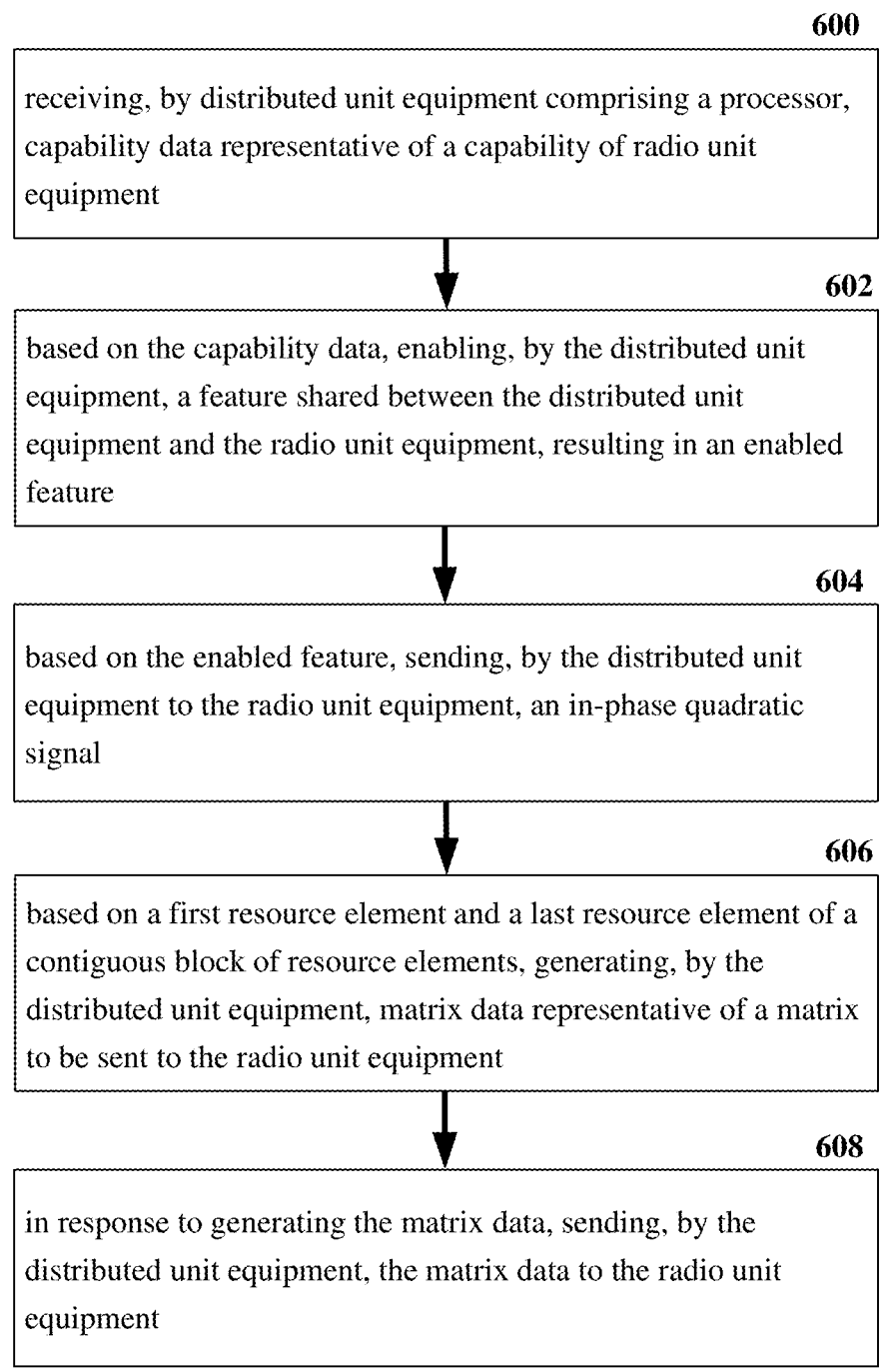
FIG. 6 illustrates an example flow diagram for a method for shared mobile edge computing for a 5G network according to one or more embodiments.

Referring now to FIG. 6, illustrated is an example flow diagram for a method for shared mobile edge computing for a 5G network according to one or more embodiments.

At element 600, the method can comprise determining, by server equipment comprising a processor, that a first user equipment is at a location associated with a tenant identity indicative of a tenant. At element 602, the method can comprise receiving, by the server equipment from router equipment, user equipment data representative of subscriber traffic from the first user equipment. At element 604, the method can comprise receiving, by the server equipment from a second user equipment, condition data representative of a condition to be applied to the subscriber traffic. Additionally, at element 606, in response to the condition being determined to have been satisfied, the method can comprise sending, by the server equipment, the subscriber traffic to a data store. Furthermore, at element 608, in response to sending the subscriber traffic to the data store, the method can comprise sending, by the server equipment, application data to the first user equipment to utilize an application associated with the tenant identity.

Figure 7:
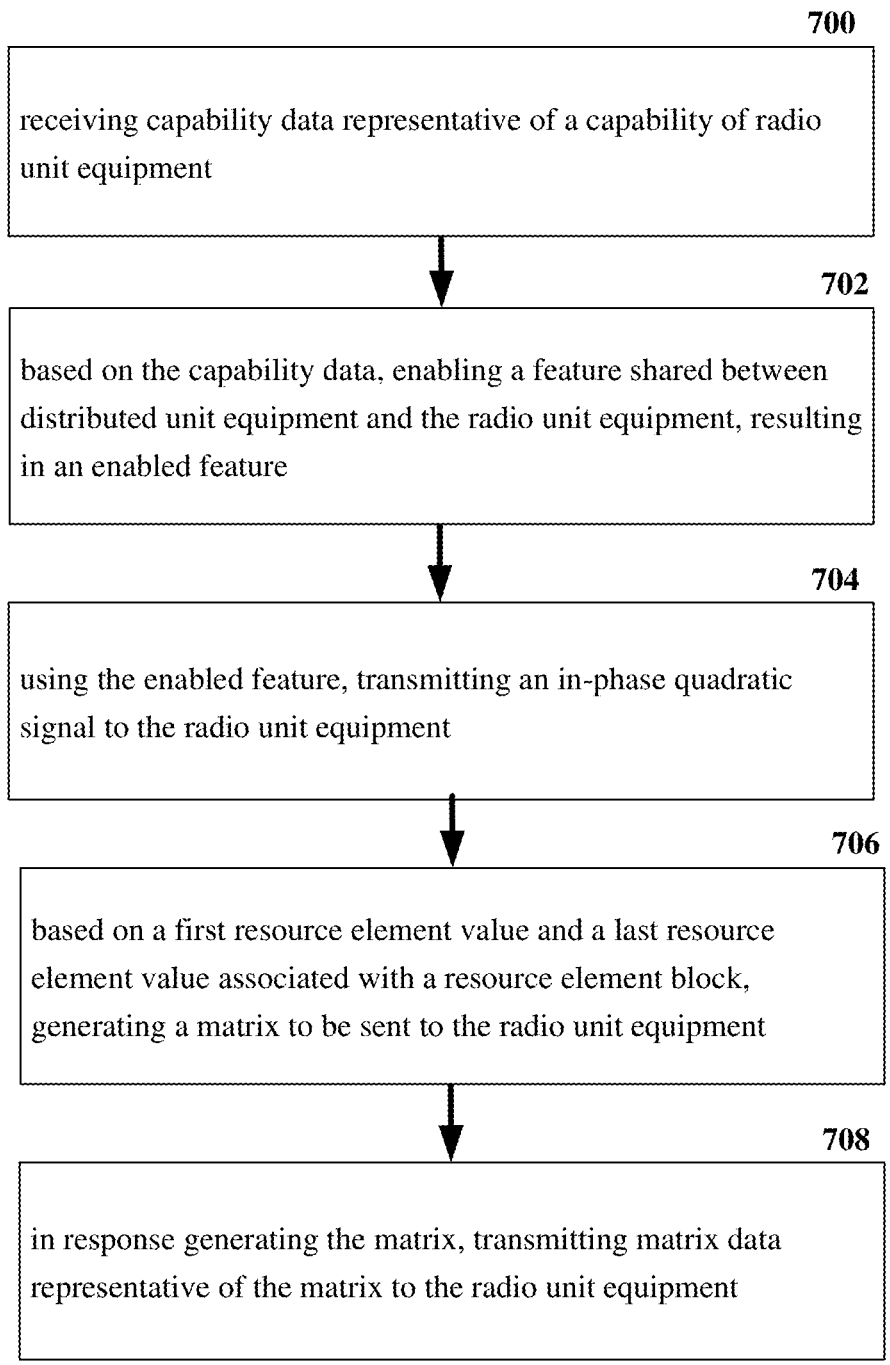
FIG. 7 illustrates an example flow diagram for a system for shared mobile edge computing for a 5G network according to one or more embodiments.

Referring now to FIG. 7, illustrated is an example flow diagram for a system for shared mobile edge computing for a 5G network according to one or more embodiments.

At element 700, the system can facilitate, determining that a first user equipment associated with a tenant identity has satisfied a location criterion associated with authorized utilization of radio access network equipment. At element 702, in response to determining that the first user equipment has satisfied the location criterion, the system can comprise receiving, from router equipment, user equipment data representative of subscriber traffic from the first user equipment. At element 704, the system can comprise receiving, from a second user equipment, condition data representative of a condition to be applied to the subscriber traffic. Additionally, at element 706, in response to the condition being determined to have been satisfied, the system can comprise sending the user equipment data representative of the subscriber traffic to a data store. Furthermore, at element 708, in response to sending the user equipment data representative of the subscriber traffic to the data store, the system can comprise sending, to the first user equipment, application data representative of an application.

Figure 8:
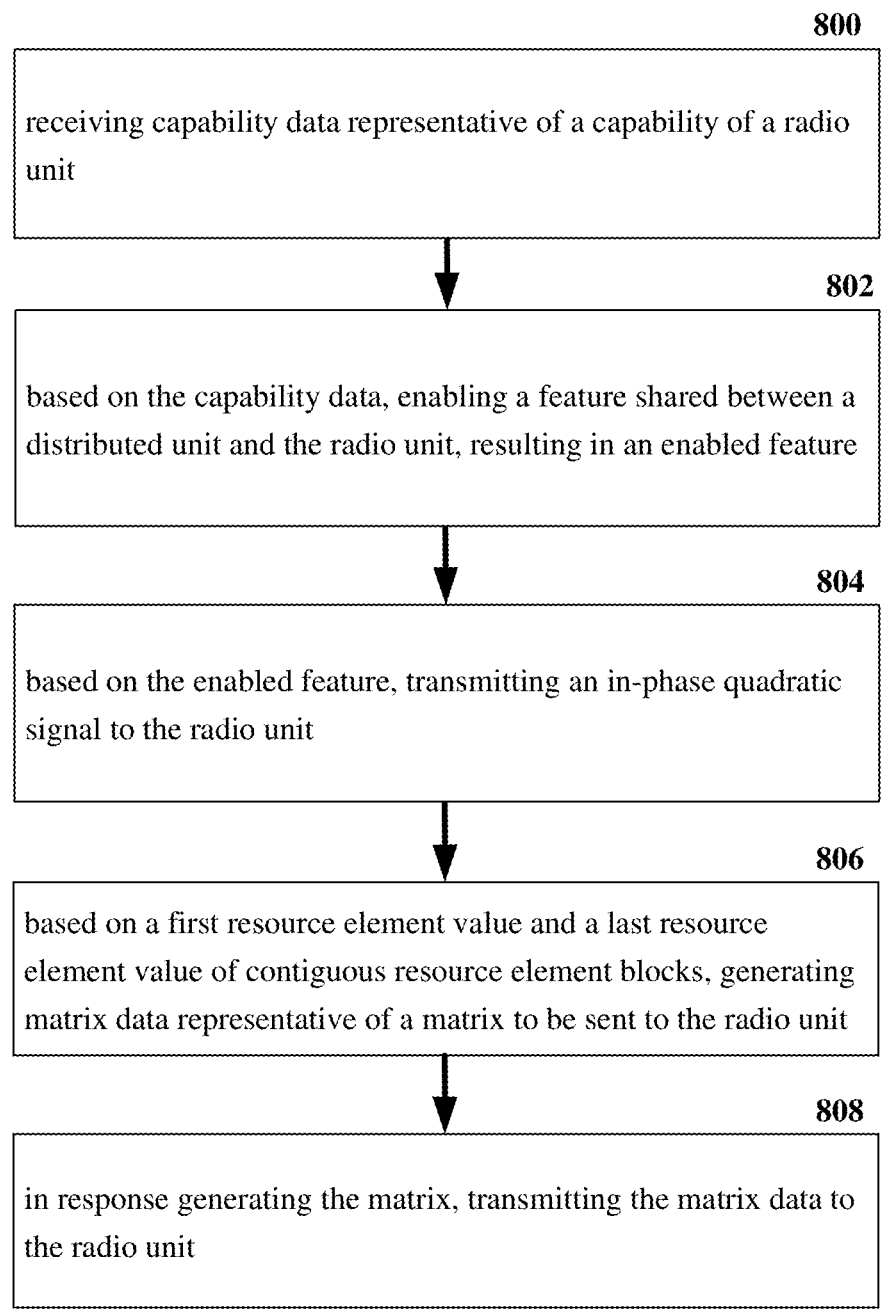
FIG. 8 illustrates an example flow diagram for a machine-readable medium for shared mobile edge computing for a 5G network according to one or more embodiments.

Referring now to FIG. 8, illustrated is an example flow diagram for a machine-readable medium for shared mobile edge computing for a 5G network according to one or more embodiments.

At element 800, the machine-readable medium that can perform the operations comprising determining that a first user equipment is at a location associated with a tenant identity associated with a local area network. At element 802, the machine-readable medium can perform the operations comprising receiving, from router equipment, user equipment data representative of subscriber traffic from the first user equipment. At element 804, the machine-readable medium can perform the operations comprising receiving, from a second user equipment, condition data representative of a condition to be applied to the subscriber traffic. Additionally, at element 806, in response to the condition being determined to have been satisfied, the machine-readable medium can perform the operations comprising sending the user equipment data to a data store. Furthermore, at element 808, in response to sending the user equipment data to the data store, the machine-readable medium can perform the operations comprising sending application data to the first user equipment for the first user equipment to utilize an application associated with the tenant identity.

Figure 9:
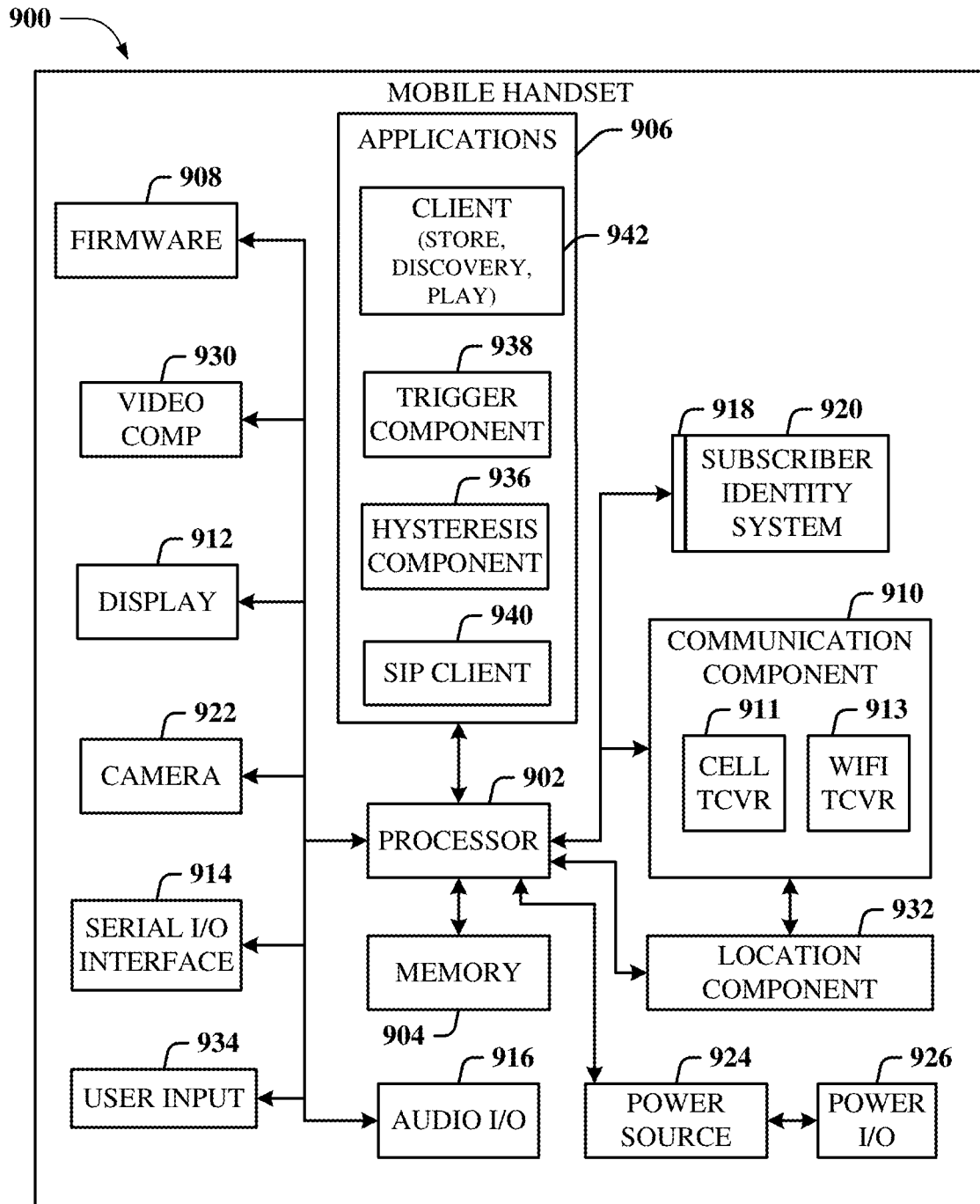
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, main-frame computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, random access memory (RAM), read only memory (ROM), electrically erasable programmable ROM (EEPROM), flash memory or other memory technology, compact disk ROM LCD ROW, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, voice over Internet Protocol (VoIP) networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a caller identification (ID) function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial input/output (I/O) interface 914 is provided in communication with the processor 902 to facilitate wired and/or wireless serial communications (e.g., USB, and/or Institute of Electrical and Electronics Engineers (IEEE) 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an Internet service provider (ISP) or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an alternating current (AC) power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A session initiation protocol (SIP) client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
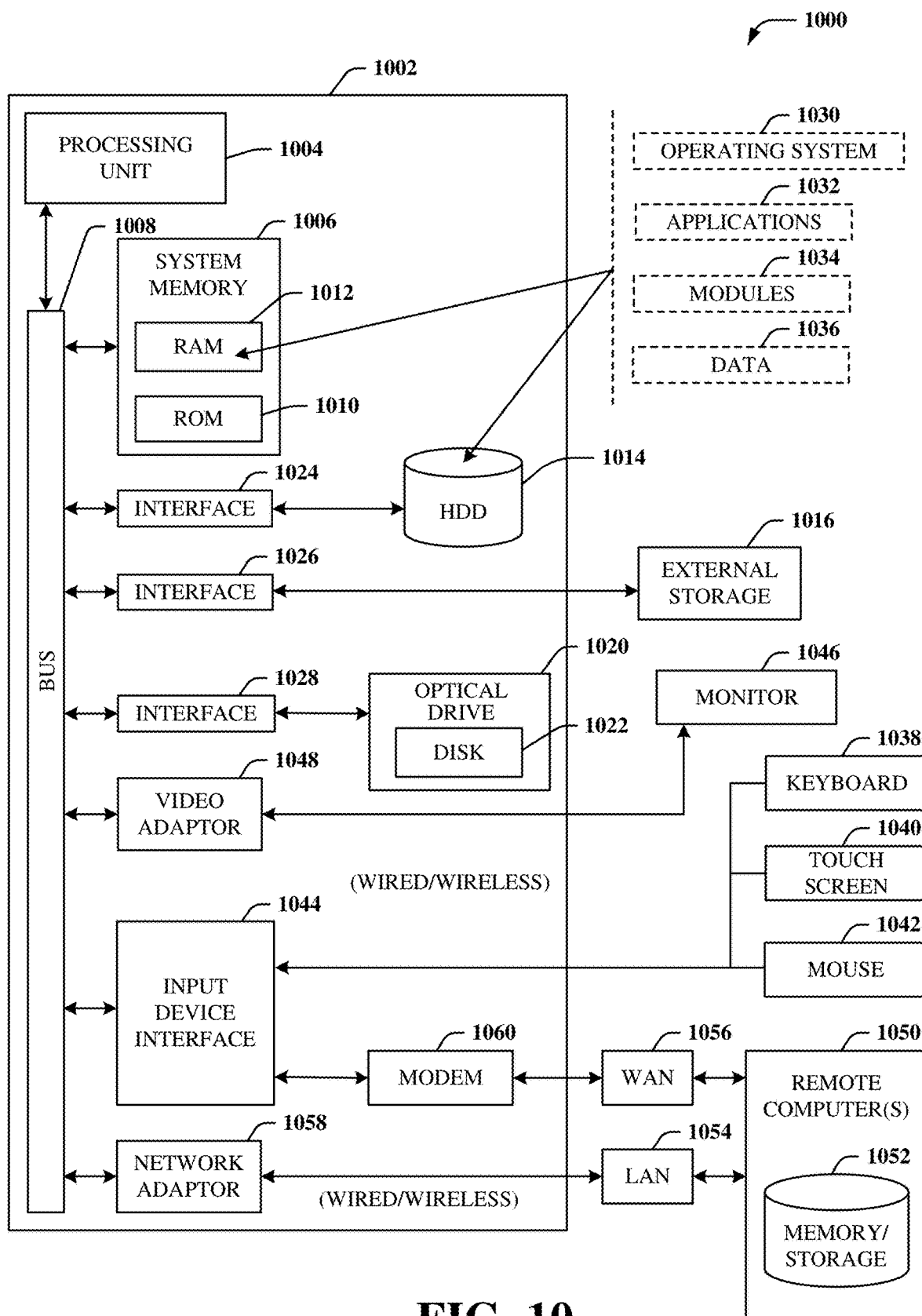
FIG. 10 illustrates an example block diagram of an example computer operable to engage in a system architecture that facilitates secure wireless communication according to one or more embodiments described herein.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.9 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at a 9 megabits per second (Mbps) (802.9a) or 54 Mbps (802.10b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by server equipment comprising a processor, that a first user equipment is at a location associated with a tenant identity indicative of a tenant, wherein the location is associated with the server equipment, and wherein the server equipment is associated with a mobile edge computing network;

receiving, by the server equipment from router equipment, user equipment data representative of subscriber traffic from the first user equipment, wherein the subscriber traffic comprises first subscriber traffic of a first data type and second subscriber traffic of a second data type;

filtering, by the server equipment, the subscriber traffic with respect to the tenant identity;

based on the filtering, partitioning, by the server equipment, the subscriber traffic to generate the first subscriber traffic of the first data type and the second subscriber traffic of the second data type;

receiving, by the server equipment from a second user equipment, condition data representative of a condition to be applied to the subscriber traffic;

determining, by the server equipment, that the first subscriber traffic satisfies the condition and the second subscriber traffic does not satisfy the condition based on a filtering criterion relating to data types, wherein the data types comprise the first data type and the second data type;

in response to determining that the condition is satisfied with regard to the first subscriber traffic, sending, by the server equipment, the first subscriber traffic to a data store associated with the mobile edge computing network;

in response to determining that the condition is not satisfied with regard to the second subscriber traffic, sending, by the server equipment, the second subscriber traffic to external network equipment associated with an external core network, wherein the external network equipment and the external core network are external to the mobile edge computing network associated with the server equipment;

in response to sending the first subscriber traffic to the data store, sending, by the server equipment, application data to the first user equipment to utilize an application associated with the tenant identity;

in response to determining that the condition is satisfied with regard to the first subscriber traffic and sending the first subscriber traffic to the data store, determining, by the server equipment, that a tenant account associated with the tenant identity is to be charged for the first subscriber traffic sent to the data store; and in response to determining that the condition is not satisfied with regard to the second subscriber traffic and sending the second subscriber traffic to the external network equipment associated with the external core network, determining, by the server equipment, that the tenant account is not to be charged for the second subscriber traffic sent to the external network equipment.

2. The method of claim 1, wherein the first subscriber traffic is sent to the data store via a firewall of the server equipment.

3. The method of claim 2, further comprising:
receiving, by the server equipment, filter data representative of the filtering criterion applicable to the subscriber traffic.

4. The method of claim 3, wherein the tenant identity is a first tenant identity indicative of a first tenant, and wherein the method further comprises:
based on the filtering criterion, filtering the subscriber traffic with respect to a second tenant identity indicative of a second tenant and different than the first tenant identity.

5. The method of claim 1, further comprising:
monitoring, by the server equipment, a bandwidth associated with the tenant identity to determine whether the subscriber traffic has exceeded a bandwidth limit applicable to the tenant identity.

6. The method of claim 5, further comprising:
determining, by the server equipment, that the subscriber traffic has exceeded the bandwidth limit.

7. The method of claim 6, further comprising:
in response to determining that the subscriber traffic has exceeded the bandwidth limit, limiting, by the server equipment, the subscriber traffic in accordance with the bandwidth limit.

8. A system, comprising:
a processor; and
a memory that stores executable instructions that, when executed by the processor, facilitate performance of operations, comprising:
   determining that a first user equipment associated with a tenant identity has satisfied a location criterion associated with authorized utilization of radio access network equipment, wherein the location criterion relates to a location that is associated with the radio access network equipment that is associated with a local radio access network;
   in response to determining that the first user equipment has satisfied the location criterion, receiving, from router equipment, user equipment data representative of subscriber traffic from the first user equipment, wherein the subscriber traffic comprises first subscriber traffic of a first data traffic type and second subscriber traffic of a second data traffic type;
   filtering the subscriber traffic with respect to the tenant identity;
   based on the filtering, partitioning the subscriber traffic to generate the first subscriber traffic of the first data traffic type and the second subscriber traffic of the second data traffic type;
   receiving, from a second user equipment, condition data representative of a condition to be applied to the subscriber traffic;
   determining that the first subscriber traffic satisfies the condition and the second subscriber traffic does not satisfy the condition based on a filtering criterion relating to data traffic types;
   in response to determining that the condition is satisfied with regard to the first subscriber traffic, sending a first portion of the user equipment data representative of the first subscriber traffic to a data store;
   in response to determining that the condition is not satisfied with regard to the second subscriber traffic, sending a second portion of the user equipment data representative of the second subscriber traffic to external network equipment associated with an external core network, wherein the external network equipment and the external core network are external to the local radio access network associated with the radio access network equipment;
   in response to sending the first portion of the user equipment data representative of the first subscriber traffic to the data store, sending, to the first user equipment, application data representative of an application;
   in response to determining that the condition is satisfied with regard to the first subscriber traffic and sending the first portion of the user equipment data representative of the first subscriber traffic to the data store, determining that a tenant account associated with the tenant identity is to be charged for the first portion of the user equipment data sent to the data store; and
   in response to determining that the condition is not satisfied with regard to the second subscriber traffic and sending the second portion of the user equipment data representative of the second subscriber traffic to the external network equipment associated with the external core network, determining that the tenant account is not to be charged for the second portion of the user equipment data sent to the external network equipment.

9. The system of claim 8, wherein the application is for authorized use at the first user equipment in association with the tenant identity.

10. The system of claim 8, wherein the operations further comprise:
in response to sending the application data to the first user equipment, monitoring third subscriber traffic received from the first user equipment.

11. The system of claim 10, wherein the operations further comprise:
in response to monitoring the third subscriber traffic, reporting the third subscriber traffic to network equipment associated with a service provider identity to analyze at least part of the third subscriber traffic associated with usage of the application at the first user equipment.

12. The system of claim 10, wherein the operations further comprise:
in response to monitoring the third subscriber traffic, determining that the user equipment data, comprising data representative of the third subscriber traffic, exceeds a threshold size value, wherein the threshold size value had been received from the second user equipment.

13. The system of claim 12, wherein the operations further comprise:
in response to determining that the user equipment data exceeds the threshold size value, limiting the user equipment data.

14. The system of claim 13, wherein the operations further comprise:
in response to limiting the user equipment data, receiving instruction data representative of an instruction to terminate the third subscriber traffic received from the first user equipment.

15. A non-transitory machine-readable medium, comprising executable instructions that, when executed by a processor, facilitate performance of operations, comprising:
determining that a first user equipment is at a location associated with a tenant identity, wherein the location is associated with local server equipment that is associated with a local area network;

receiving, from router equipment, user equipment data representative of subscriber traffic from the first user equipment, wherein the user equipment data representative of the subscriber traffic comprises first user equipment data representative of first subscriber traffic of a first data type and second user equipment data representative of second subscriber traffic of a second data type;

filtering the subscriber traffic with respect to the tenant identity;

based on the filtering, partitioning the subscriber traffic to generate the first subscriber traffic of the first data type and the second subscriber traffic of the second data type;

receiving, from a second user equipment, condition data representative of a condition to be applied to the subscriber traffic;

determining that the first subscriber traffic satisfies the condition and the second subscriber traffic does not satisfy the condition based on a filtering criterion relating to data types;

in response to determining that the condition is satisfied with regard to the first subscriber traffic, communicating the first user equipment data representative of the first subscriber traffic to a data store;

in response to determining that the condition is not satisfied with regard to the second subscriber traffic, communicating the second user equipment data representative of the second subscriber traffic to a base station associated with a wide area network, wherein the base station and the wide area network are external to the local area network;

in response to communicating the first user equipment data to the data store, communicating application data to the first user equipment for the first user equipment to utilize an application associated with the tenant identity;

in response to determining that the condition is satisfied with regard to the first subscriber traffic and communicating the first user equipment data to the data store, determining that a tenant account associated with the tenant identity is to be charged for the first user equipment data communicated to the data store; and in response to determining that the condition is not satisfied with regard to the second subscriber traffic and communicating the second user equipment data to the base station associated with the wide area network, determining that the tenant account is not to be charged for the second user equipment data communicated to the base station.

16. The non-transitory machine-readable medium of claim 15, wherein the tenant identity is a first tenant identity, wherein the application data is first application data, and wherein the operations further comprise:

partitioning the first application data from second application data associated with a second tenant identity associated with the local area network.

17. The non-transitory machine-readable medium of claim 15, wherein the operations further comprise:

in response to determining that the condition is not satisfied with regard to the second subscriber traffic, facilitating a connection of the first user equipment to the base station that is part of the wide area network.

18. The non-transitory machine-readable medium of claim 15, wherein the operations further comprise:

in response to communicating the application data to the first user equipment, generating billing data representative of a usage associated with the application by the first user equipment.

19. The non-transitory machine-readable medium of claim 18, wherein generating the billing data representative of the usage is based on a defined data rate.

20. The non-transitory machine-readable medium of claim 19, wherein the defined data rate is set by and received from the second user equipment.

\* \* \* \* \*